United States Patent [19]

Whiteman, Jr.

[11] Patent Number: 5,061,077
[45] Date of Patent: Oct. 29, 1991

[54] KNOCK OUT PADDLE SHAFT FOR MIXING MACHINES

[76] Inventor: Marvin E. Whiteman, Jr., 2254 Braniff St., Boise, Id. 83706

[21] Appl. No.: 450,443

[22] Filed: Dec. 14, 1989

[51] Int. Cl.5 ............................................. B28C 5/14
[52] U.S. Cl. ...................................... 366/64; 366/46;
366/47; 285/32; 285/38; 285/330; 403/338; 403/342
[58] Field of Search .................... 366/64, 67, 331, 325,
366/45, 46, 47, 48, 66, 185, 189, 194, 312;
285/18, 19, 20, 31, 32, 38, 413, 330; 403/338, 342, 380

[56] References Cited

U.S. PATENT DOCUMENTS

| | | | |
|---|---|---|---|
| 1,666,802 | 4/1928 | Von Allmen | 285/38 |
| 1,673,723 | 6/1928 | Van Arsdale | 285/38 |
| 3,043,571 | 7/1962 | Swarthout | 366/46 |
| 3,921,245 | 11/1975 | Clark | 15/179 |
| 4,097,926 | 6/1978 | Face, Jr. | 366/64 |
| 4,509,860 | 4/1985 | Lasar, III | 366/185 |

Primary Examiner—Harvey C. Hornsby
Assistant Examiner—Gary K. Graham
Attorney, Agent, or Firm—Frank J. Dykas; Craig M. Korfanta

[57] ABSTRACT

A removable three-piece paddle shaft assembly (30) for use in a mixing machine such as a mortar mixer (11) is disclosed. Three-piece paddle shaft assembly (30) includes paddle shaft drive spindle (31), main paddle shaft (32), and a paddle shaft supporting spindle (33). Main paddle shaft (32) is coaxially coupled at its ends to paddle shaft drive spindle (32) and the paddle shaft supporting spindle (33) using a pair of removable coaxial couplers (35). Removable coaxial couplers (35), here each consist of a spline type connection and a cooperating coupling nut (38). Coupling nuts (38) are provided with radially extending hammer protuberances to facilitate rotation of the coupling nuts using only a hammer. Complete removal and reinstallation of main paddle shaft (32) can be accomplished without disassembly of cylindrical mixing drum (12) or double-action bearings (15) and (16).

4 Claims, 4 Drawing Sheets

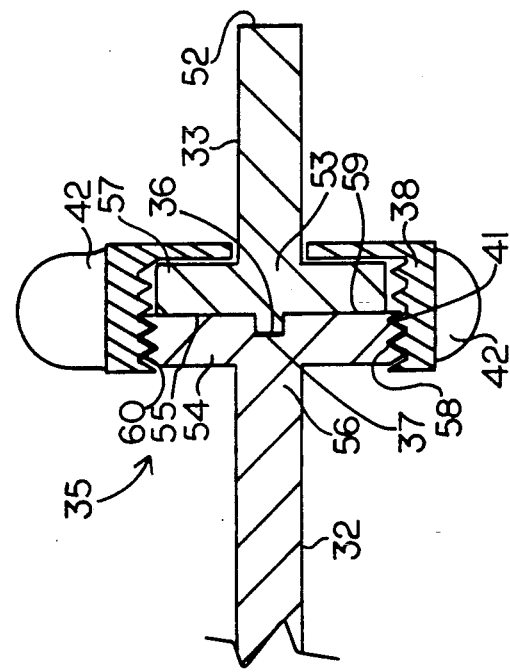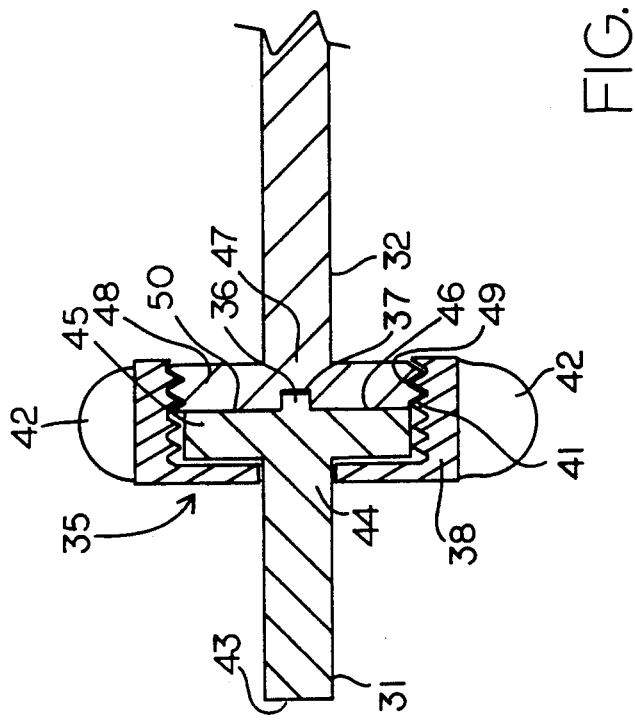
FIG. 2

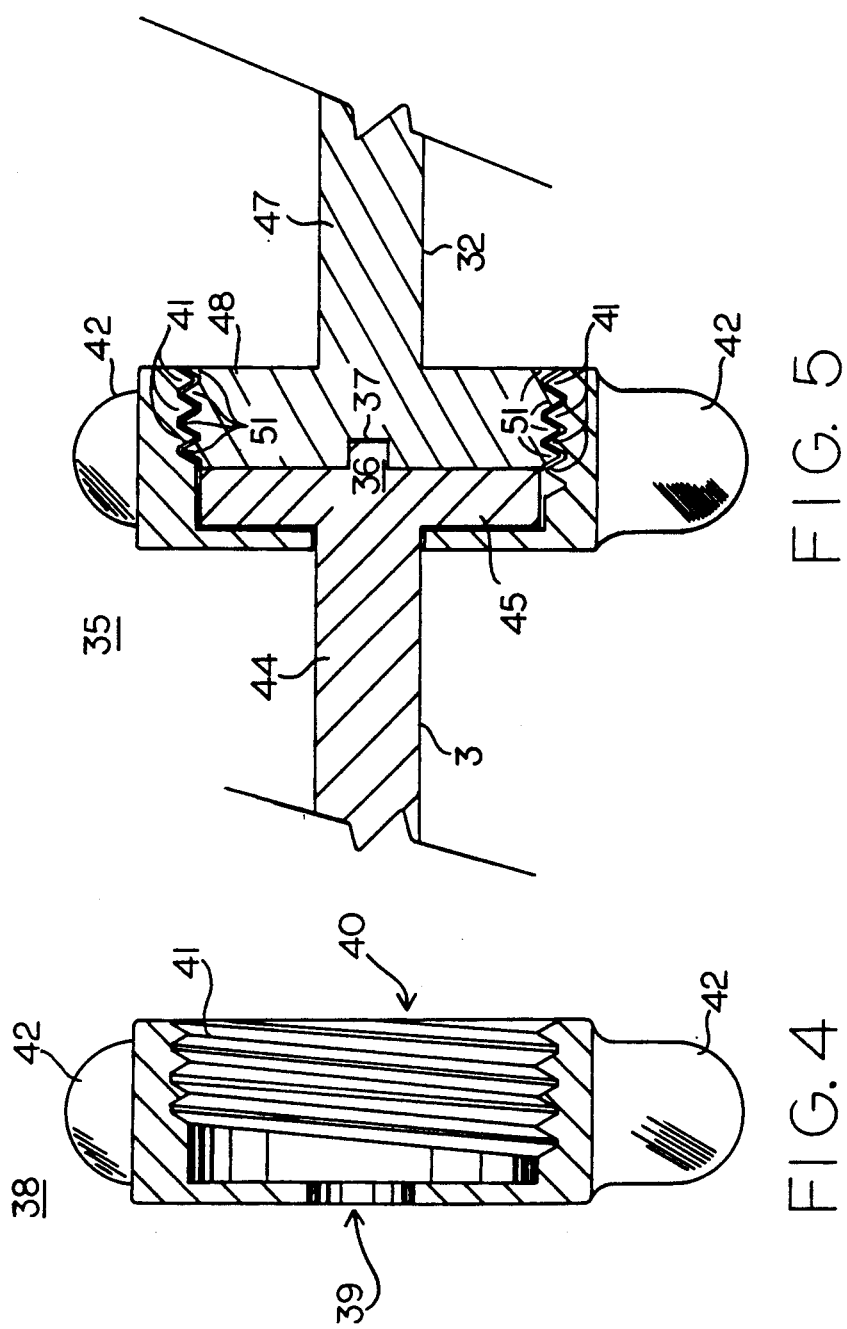

KNOCK OUT PADDLE SHAFT FOR MIXING MACHINES

BACKGROUND OF THE INVENTION

1. Technical Field

This invention generally relates to removable paddle shaft assemblies for mixing machines such as mortar mixers, and in particular it relates to a removable paddle shaft assembly which does not require any disassembly of the mixer for removal and reinstallation of the paddle shaft assembly.

2. Background Art

Mixing machines, such as mortar mixers and the like, generally have a horizontally disposed cylindrical drum including an opening along its top side and a paddle shaft assembly being coaxially and rotationally secured within the drum which includes a plurality of radially extending mixing paddles. A drive means is provided for rotationally driving the paddle shaft assembly to facilitate mixing of the contents in the mixing drum. The mixing drum is pivotally secured to a mixer frame via a pair of double actioned bearing assemblies. The bearing assemblies allow the drum to be radially displaced between an upright mixing position and an angular dumping position without interfering with the rotation of the paddle shaft assembly. A hinged grate covers the top opening as a safety precaution to prevent foreign objects form entering the mixing drum while mixing.

Because of the abrasive environment inside the mixing drum, the mixing paddles wear quickly and consequently must be replaced frequently. Presently, this is accomplished by a service technician or mechanic in a repair shop, due to the complexity of the bearing assemblies and the fact that the mixing drum must be disassembled. Mortar mixers receive very little, if any, in field service. The service which is accomplished in the field is usually done with a hammer in a haphazard manner. This is simply a consequence of the construction environment.

Because of the environment in which mortar mixers are used and the reluctance of construction workers to properly service mortar mixers, the mixers spend a great deal of time in the shop being serviced and having worn parts replaced. The ideal mortar mixer would be one which requires very little maintenance and one in which the maintenance which is required could be performed in the field by a construction worker armed only with a hammer, since this seems to be the tool of choice.

FACE, JR., U.S. Pat. No. 4,097,926 teaches a mortar mixer having a removable paddle shaft assembly which can be removed without major disassembly of the bearings, or mixing drum. Face, Jr. uses a specialized bearing assembly on one end which includes a through sleeve for receiving a quill shaft. The quill shaft extends coaxially through the mixing drum, engaging a hollow paddle shaft, and is coupled to a drive shaft at a first end. The second end of the quill shaft includes a flange member which is subsequently attached to a flange on the receiving sleeve. To remove the hollow paddle shaft, one has to decouple the quill shaft flange from the receiving sleeve flange and withdraw the quill shaft from the drum. This disengages the quill shaft with the hollow paddle shaft and the paddle shaft can then be removed out the top opening of the mixing drum and a new paddle shaft can be reinstalled. Besides requiring a non-preferred bearing assembly, this paddle shaft assembly requires the use of a screw driver or wrench for removal, neither of which are the construction worker's tool of choice. Additionally, in order to be able to withdraw the quill shaft, it must be kept free from dried mortar which readily adheres to the metal surfaces. This requires thorough and frequent cleaning of the paddle shaft assembly which is rarely done.

What is needed is a removable paddle shaft assembly which does not require disassembly of the bearing assemblies or mortar mixer drum, wherein removal and reinstallation of the paddle shaft assembly can be accomplished using only a hammer.

Accordingly, it is an object of this invention to provide an easily replaceable paddle shaft assembly which can be removed and reinstalled having access to only the interior of the drum without any disassembly of the bearings or mixer drum using only a hammer.

DISCLOSURE OF INVENTION

This and other objects are accomplished by a three-piece paddle shaft assembly including a paddle shaft drive spindle, a main paddle shaft, and a paddle shaft supporting spindle. Removable coaxial couplers are provided which rotationally positively couple the three paddle shaft segments together. The removable coaxial couplers are provided with radially disposed hammer protuberances which facilitate the removal and installation using only a hammer.

The main paddle shaft includes a plurality of radially extending mixing paddles disposed between its two ends. Each end is provided with a spline connecting surface which cooperates with a corresponding spline connecting surface on both the paddle shaft drive spindle and the paddle shaft supporting spindle. Once the spline surfaces are properly engaged the removable coupling nuts axially secure the spline surfaces together.

BRIEF DESCRIPTION OF THE DRAWINGS

FIG. 2 is a side cross sectional view of the three-piece paddle shaft assembly.

FIG. 4 is a side cross sectional view of a coupling nut.

FIG. 5 is a side cross sectional view of an assembled coaxial coupler.

BEST MODE FOR CARRYING OUT INVENTION

Figure 1:
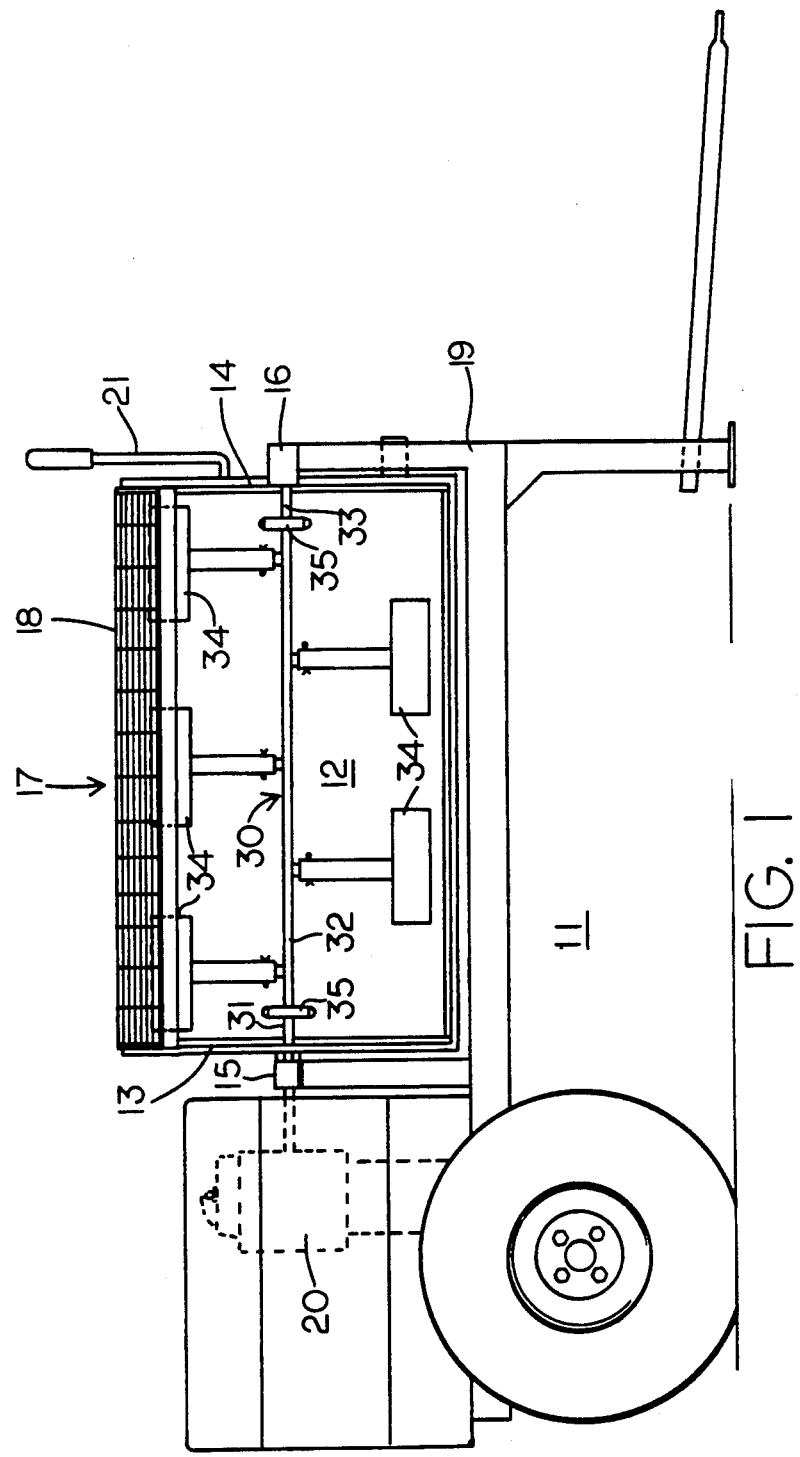
FIG. 1 is a side view of a mortar mixer drum having its forward facing surface cut away.
Figure 3:
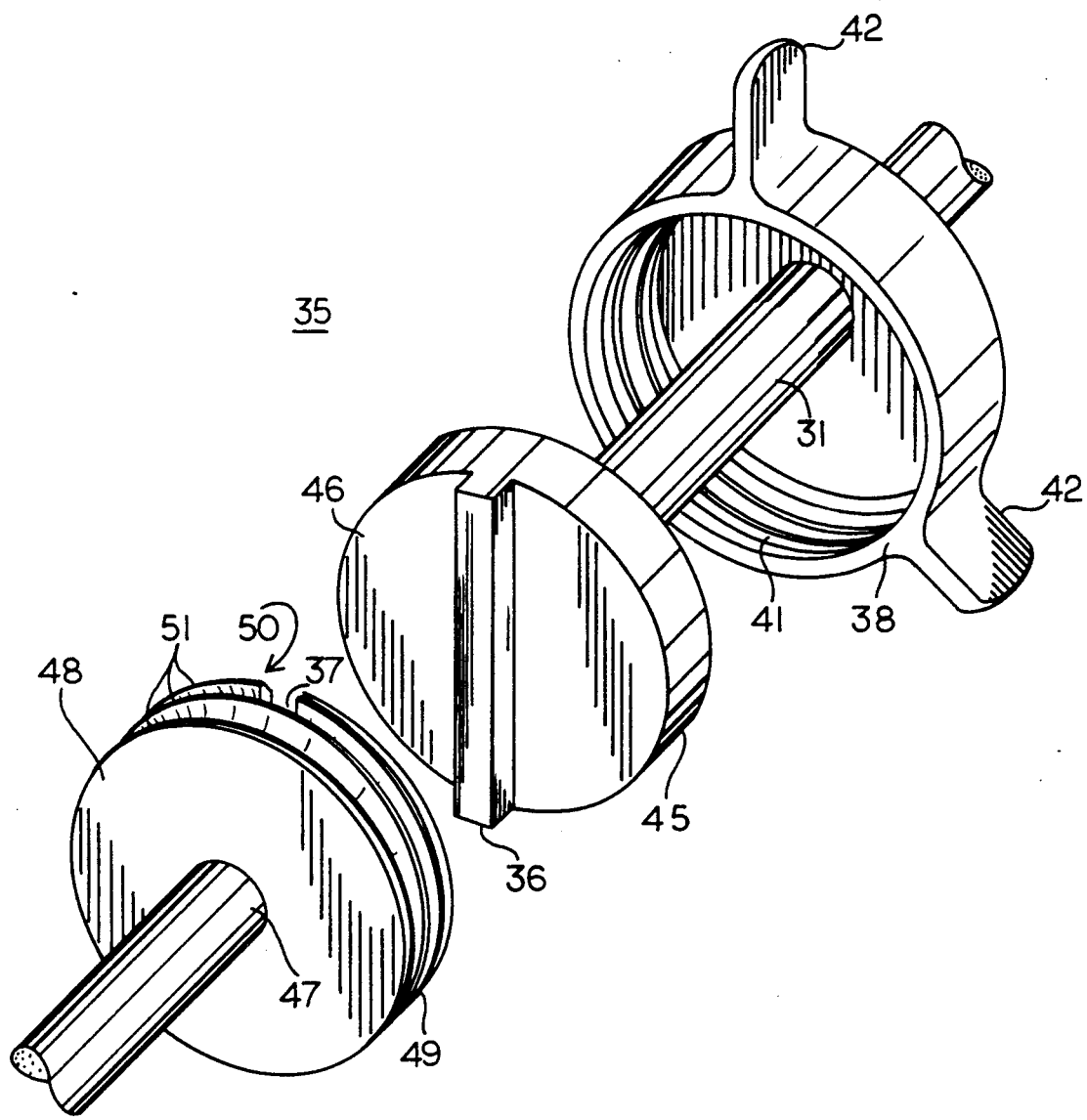
FIG. 3 is an exploded view of a removable coaxial coupler.

Referring now to FIGS. 1 through 5, a removable three-piece paddle shaft assembly 30 is shown. In FIG. 1, three-piece paddle shaft assembly 30 is installed within cylindrical mixing drum 12 of mortar mixer 11. Cylindrical mixing drum 12 generally has a first opposing end wall 13 and a second opposing end wall 14 supported on first double-action bearing 15 and second double-action bearing 16, both being connected to frame 19. Dumping handle 21 is secured to second opposing end wall 14 for rotating cylindrical mixing drum 12 between an upright mixing position and an angular dumping position. Top opening 17 is provided in cylindrical mixing drum 12 and is generally covered by a hinged crate 18 to prevent foreign objects from entering the drum during mixing. A paddle shaft drive means 20, typically a gasoline engine, is provided to facilitate mixing mortar within cylindrical mixing drum 12.

Three-piece paddle shaft assembly 30 here consists of a first shaft segment 31, hereinafter called the paddle shaft drive spindle 31, second shaft segment 32, hereinafter referred to as main paddle shaft 32, and a third shaft segment 33, hereinafter called the paddle shaft drive supporting spindle 33. Main paddle shaft 32 has a plurality of radially extending mixing paddles 34 connected thereto. A pair of removable coaxial couplers 35 are provided to coaxially connect main paddle shaft 32 to paddle shaft drive spindle 31 and paddle shaft supporting spindle 33.

Paddle shaft drive spindle 31 has a first end 43 which is connected to paddle shaft drive means 20 through double-action bearing 15. The second end 44 of paddle shaft drive spindle 31 is provided with a first annular flange 45. First annular flange 45 defines a first disc shaped surface 46, to which a diametrically disposed key 36 is attached. A second annular flange 48 is coaxially attached to a first end 47 of main paddle shaft 32. Second annular flange 48 defines a second disc shaped surface 50 and a first outer cylindrical surface 49. A diametrically disposed key way 37 is provided within second disc shaped surface 50 and is sized and shaped to closely receive diametrically disposed key 36 on first disc shaped surface 46. In this manner a spline connection is provided between a second end 44 of paddle shaft drive spindle 31 and the first end 47 of main paddle shaft 33 to rotationally and positively couple the two together.

A first coupling nut 38 axially secures the spline connection. This is accomplished by providing coupling nut 38 with a first annular opening 39 which slidably receives first paddle shaft drive spindle 31 and a second annular opening 40 which encompasses both the first annular flange 45 and the second annular flange 48. A set of male threads 51 circumscribe the first outer cylindrical surface 49 and threadedly engage with a set of female threads 41 which circumvent the inner surface of second annular opening 40. A plurality of radially disposed hammer protuberances 42 are attached around the outer surface of coupling nut 38 to facilitate rotation of coupling nut 38 by striking the protuberances with a hammer or similar object.

Identically, a second end 56 of main paddle shaft 32 is coaxially attached to a second end 53 of paddle shaft supporting spindle 33. Paddle shaft supporting spindle 33 has its first end 52 supported and secured by second double-action bearing 16. A third annular flange 54 is attached to the second end 56 of main paddle shaft 32 and defines a third disc shaped surface 55 in which a second diametrically disposed key 37 is provided and also defines a second outer cylindrical surface 58. A fourth annular flange 57 is attached to the second end 53 of paddle shaft supporting spindle 33 and defines a fourth disc shape surface 59. A diametrically disposed key 36 is also provided on fourth disc shaped surface 59 and mates with second diametrically disposed key way 37. A second coupling nut 38 is provided to axially secure the spline connection between the third disc shape surface 55 and the fourth disc shaped surface 59. Again this is accomplished by a second set of male threads 60 which circumscribe the second outer surface 58 and threadedly engage the female threads 41 of the second coupling nut 38.

The foregoing paddle shaft assembly 30 allows a construction worker armed only with a hammer to remove and reinstall main paddle shaft 32 without disassembling mortar mixer 11, cylindrical mixing drum 12, or the first and second double-action bearing assemblies 15 and 16. The construction worker simply has to gain access to the cylindrical mixing drum through the top opening 17 and strike the hammer protuberances 42 with his or her hammer. Once coupling nuts 38 have been disengaged from their cooperating male threads 51 and 60, main paddle shaft 32 can be disengaged from the spline connections and removed through top opening 17. To reinstall a new main paddle shaft 32, the construction worker simply reverses the process.

While there is shown and described the present preferred embodiment of the invention, it is to be distinctly understood that this invention is not limited thereto but may be variously embodied to practice within the scope of the following claims.

Accordingly, what I claim is:

1. In a mortar mixer having a generally horizontally disposed cylindrical mixing drum including two opposing end walls, each with a paddle shaft bearing assembly attached thereto for rotatably supporting a paddle shaft segment, said paddle shaft bearing assemblies further being in axial alignment with each other, a paddle shaft assembly which comprises:

first and third paddle shaft segments, each rotatably supported by a paddle shaft bearing assembly, and further, each extending through opposite end walls of the mixing drum into the interior of said mixing drum;

a second paddle shaft segment for removable coaxial interconnection between said first and third paddle shaft segments; and a pair of removable coaxial coupling means each having a single annular threaded connection coaxial with said paddle shaft segments and being disposed within the interior of said mixing drum for coaxially and positively coupling a first shaft segment to one end of said second shaft segment within the interior of the mixing drum, and for coaxially and positively coupling a second end of said second shaft segment to one end of said third shaft segment within the interior of the mixing drum.

2. The mortar mixer of claim 1 wherein said removable coaxial coupling means comprises key, key way and coupling nut connections between the respective ends of said second shaft segment and said first and third shaft segments.

3. In a mixer having a horizontally disposed cylindrical mixing drum including two opposing end walls and an opening along its top side, said mixer further having a paddle shaft drive means, the improvement which comprises:

a paddle shaft drive spindle being rotatably attached through a first opposing end wall and coaxially extending partially into said mixing drum, said paddle shaft drive spindle having a first end being attached to said paddle shaft drive means for receiving rotation therefrom;

said paddle shaft drive spindle having a first annular flange being attached to and circumscribing a second end, said first flange defining a first disk-shaped surface being coaxially disposed at the second end of said drive spindle;

a first key being attached to and protruding from said first disk-shaped surface;

a paddle shaft having a plurality of mixing paddles radially attached thereto, said paddle shaft having a first end and a second end including a second annular flange being attached around and circumscribing the paddle shaft's first end, said second annular flange defining a first outer cylindrical surface and a coaxially disposed second disk-shaped surface, said second disk-shaped surface having a first key way being shaped to and closely receiving said first key, thereby rotationally positively coupling said paddle shaft and said paddle shaft drive spindle, said first outer cylindrical surface having a set of male threads circumscribing its outer surface;

a first coupling nut having a first annular opening being slidably and rotationally engaged on said paddle shaft drive spindle, said first coupling nut having a second annular opening receiving said first annular flange and said first outer cylindrical surface, said second annular opening having a set of female threads being threadedly engaged with the male threads on said first cylindrical surface;

a paddle shaft supporting spindle being rotationally attached through a second opposing end wall and coaxially extending partially into said mixing drum, said paddle shaft supporting spindle having a third annular flange being attached to and circumscribing a first end, said third flange defining a third disk-shaped surface being coaxially disposed at the first end of said supporting spindle;

a second key being attached to and protruding from said third disk-shaped surface;

said paddle shaft having a fourth annular flange being attached around and circumscribing the paddle shaft's second end, said forth annular flange defining a second outer cylindrical surface and a coaxially disposed fourth disk-shaped surface, said fourth disk-shaped surface having a second key way being shaped to and closely receiving said second key, thereby rotationally positively coupling said paddle shaft and said paddle shaft supporting spindle, said second outer cylindrical surface having a set of male threads circumscribing its outer surface; and a second coupling nut having a first annular opening being slidably and rotationally engaged on said paddle shaft supporting spindle, said second coupling nut having a second annular opening receiving said third annular flange and said second outer cylindrical surface, said second annular opening having a set of female threads being threadedly engaged with the male threads on said second cylindrical surface.

4. The improved mixer of claim 3 wherein said first and second coupler nuts each have a plurality of raidally extending hammer protuberances extending therefrom for facilitating the installation and removal of said coupler nuts and said main paddle shaft by an operator armed only with a hammer.

* * * * *